United States Patent
Masaki et al.

(10) Patent No.: US 11,229,972 B2
(45) Date of Patent: Jan. 25, 2022

(54) FRICTION STIR WELDING DEVICE AND FRICTION STIR WELDING METHOD

(71) Applicant: IHI CORPORATION, Tokyo (JP)

(72) Inventors: Kunitaka Masaki, Tokyo (JP); Naoki Oiwa, Tokyo (JP); Hiroshi Saito, Tokyo (JP)

(73) Assignee: IHI CORPORATION, Tokyo (JP)

( * ) Notice: Subject to any disclaimer, the term of this patent is extended or adjusted under 35 U.S.C. 154(b) by 36 days.

(21) Appl. No.: 15/815,350

(22) Filed: Nov. 16, 2017

(65) Prior Publication Data

US 2018/0071861 A1  Mar. 15, 2018

Related U.S. Application Data

(63) Continuation of application No. PCT/JP2016/064748, filed on May 18, 2016.

(30) Foreign Application Priority Data

May 18, 2015  (JP) .............................. JP2015-101210

(51) Int. Cl.
*B23K 20/12* (2006.01)
*B23K 20/233* (2006.01)
(Continued)

(52) U.S. Cl.
CPC .......... *B23K 20/128* (2013.01); *B23K 20/123* (2013.01); *B23K 20/1235* (2013.01);
(Continued)

(58) Field of Classification Search
CPC ................... B23K 20/1245; B23K 20/12–129
See application file for complete search history.

(56) References Cited

U.S. PATENT DOCUMENTS 6,997,369 B2 * 2/2006 Hamada ............... B23K 20/122
228/103
8,556,156 B1  10/2013 Bharadwaj
(Continued)

FOREIGN PATENT DOCUMENTS

CN  1733411 A  2/2006
CN  102922125 A  2/2013
(Continued)

OTHER PUBLICATIONS

Fukuda, T., et al., "Latest FSW process development status of TWI and patent information," Welding Technology, Sanpo Publications, Inc., Jun. 2011, vol. 59, No. 6, pp. 57-60 (with partial English translation).

*Primary Examiner* — Erin B Saad
*Assistant Examiner* — Carlos J Gamino
(74) *Attorney, Agent, or Firm* — Volpe Koenig (57) ABSTRACT

A friction stir welding device includes a friction stir welding tool equipped with a fixed shoulder on an outer periphery of a probe on a proximal end side, a main shaft positioning mechanism which relatively moves the friction stir welding tool with respect to a corner portion between workpieces a control device thereof, and a filler supply unit which supplies a filler to a stirring region in which the workpieces are stirred by the probe at the time of friction stir welding. When the probe is immersed into the corner portion to perform the friction stir welding, the fixed shoulder is maintained at a position separated by a gap from the surfaces of the workpieces with the control device.

15 Claims, 8 Drawing Sheets

(51) Int. Cl.
*B23K 20/26* (2006.01)
*B23K 103/10* (2006.01)

(52) U.S. Cl.
CPC ...... *B23K 20/1245* (2013.01); *B23K 20/1255* (2013.01); *B23K 20/2336* (2013.01); *B23K 20/26* (2013.01); *B23K 2103/10* (2018.08)

(56) References Cited

U.S. PATENT DOCUMENTS

| | | | | |
|---|---|---|---|---|
| 9,937,586 | B2 * | 4/2018 | Weigl | B23K 20/1265 |
| 2002/0092888 | A1 * | 7/2002 | Ezumi | B23K 20/1245 |
| | | | | 228/112.1 |
| 2003/0192941 | A1 * | 10/2003 | Ishida | B23K 20/123 |
| | | | | 228/112.1 |
| 2007/0119906 | A1 * | 5/2007 | Mika | B23K 20/1245 |
| | | | | 228/112.1 |
| 2009/0152328 | A1 * | 6/2009 | Okamoto | B23K 20/126 |
| | | | | 228/112.1 |
| 2012/0193401 | A1 | 8/2012 | Hori et al. | |
| 2014/0166731 | A1 * | 6/2014 | Seo | B23K 20/122 |
| | | | | 228/112.1 |
| 2015/0209893 | A1 * | 7/2015 | Hori | B23K 20/1225 |
| | | | | 228/112.1 |
| 2016/0074957 | A1 * | 3/2016 | Nishida | B23K 37/0235 |
| | | | | 228/114.5 |
| 2016/0263696 | A1 | 9/2016 | Nishida et al. | |
| 2017/0001257 | A1 * | 1/2017 | Seo | B23K 20/1265 |
| 2018/0207745 | A1 * | 7/2018 | Hori | B23K 20/1265 |

FOREIGN PATENT DOCUMENTS

| | | | | |
|---|---|---|---|---|
| EP | 2266745 | A1 | | 12/2010 |
| JP | 11-320128 | A | | 11/1999 |
| JP | 2011-206786 | A | | 10/2011 |
| JP | 2013-123745 | A | | 6/2013 |
| JP | 2013-202628 | A | | 10/2013 |
| JP | 2015-085382 | A | | 5/2015 |
| JP | 2015089550 | A * | 5/2015 | ......... B23K 20/2275 |
| WO | WO-2005092558 | A1 * | 10/2005 | ......... B23K 20/1255 |
| WO | 2011/043127 | A1 | | 4/2011 |
| WO | 2015/064012 | A1 | | 5/2015 |

* cited by examiner

FRICTION STIR WELDING DEVICE AND FRICTION STIR WELDING METHOD

CROSS-REFERENCE TO RELATED APPLICATION

This application is a continuation application based on PCT Patent Application No. PCT/JP2016/064748, filed on May 18, 2016, whose priority is claimed on Japanese Patent Application No. 2015-101210, filed May 18, 2015. The contents of both the PCT Patent Application and the Japanese Patent Applications are incorporated herein by reference.

TECHNICAL FIELD

The present disclosure relates to a friction stir welding device and a friction stir welding method used for friction stir welding of workpieces.

BACKGROUND ART

As a friction stir welding tool used when performing friction stir welding, a type having a rotary shoulder which rotates integrally with a probe, and a type having a rotating probe and a non-rotatable stationary shoulder are known.

As a friction stir welding tool provided with a fixed shoulder, in order to perform friction stir welding of corner portions (inner corner portions) between workpieces to be welded, a tool having a fixed shoulder including a surface abutting corner portions of both workpiece surfaces (see, for example, Patent Document 1) is known.

Further, a technique called AdStir which forms a fillet (reinforcement) at a corner portion after welding by adding a filler when performing friction stir welding of the corner portion using a friction stir welding tool having a fixed shoulder has also been suggested (e.g., see Non-Patent Document 1).

CITATION LIST

Patent Document

[Patent Document 1]
Japanese Unexamined Patent Application, First Publication No. H11-320128

Non-Patent Document

[Non-Patent Document 1]
Tetsuo Fukuda, Takao Kakuhari, "Latest FSW process development status of TWI and patent information", WELDING TECHNOLOGY, SANPO PUBLICATIONS, INC, June 2011, Vol. 59, No. 6, p. 57-60

SUMMARY

Technical Problem

However, in the friction stir welding performed while applying a filler using a friction stir welding tool equipped with a fixed shoulder, for example, when a corner portion between workpieces made of aluminum is set as a welding target, and when the welded length is relatively long and in the order of meters, it has become apparent in recent years that defects such as roughness may occur on the surface of a fillet which is formed.

As a result of research conducted by the inventors of the present disclosure, such defects are thought to be caused by the fact that the material of the workpiece and the material of the filler softened and stirred by the probe adhere to the fixed shoulder at the time of friction stir welding or the adhered substance scratches the surface of the fillet.

Thus, the present disclosure provides a friction stir welding device and a friction stir welding method capable of inhibiting occurrence of defects on the surface of a fillet formed along a welding portion, when performing friction stir welding of a welding portion between workpieces, while adding a filler, using a friction stir welding tool provided with a fixed shoulder.

Solution to Problem

In order to solve the above problem, a friction stir welding device according to a first aspect of the present disclosure includes a friction stir welding tool provided with a fixed shoulder on an outer periphery on a proximal end side of a rotationally drivable probe; a moving unit which relatively moves the friction stir welding tool to a welding portion between workpieces in a direction along the welding portion; a control unit of the moving unit; and a filler supply unit which supplies a filler to a stirring region which is stirred by the probe at the time of friction stir welding of the welding portion, wherein the control device has a function of holding the fixed shoulder of the friction stir welding tool with the probe immersed in the welding portion, at a position separated by a gap from the surface of the workpiece.

Effects

According to the friction stir welding device and the friction stir welding method of the present disclosure, it is possible to inhibit occurrence of defects on the surface of a fillet formed along a welding portion, when performing friction stir welding of a welding portion between workpieces, while adding a filler, using a friction stir welding tool provided with a fixed shoulder.

DESCRIPTION OF EMBODIMENTS

A friction stir welding device and a friction stir welding method according to the present disclosure will be described with reference to the drawings.

[Friction Stir Welding Method]

First, the friction stir welding method of the present disclosure will be briefly described with reference to FIGS. 1A and 1B.

Figure 1A:
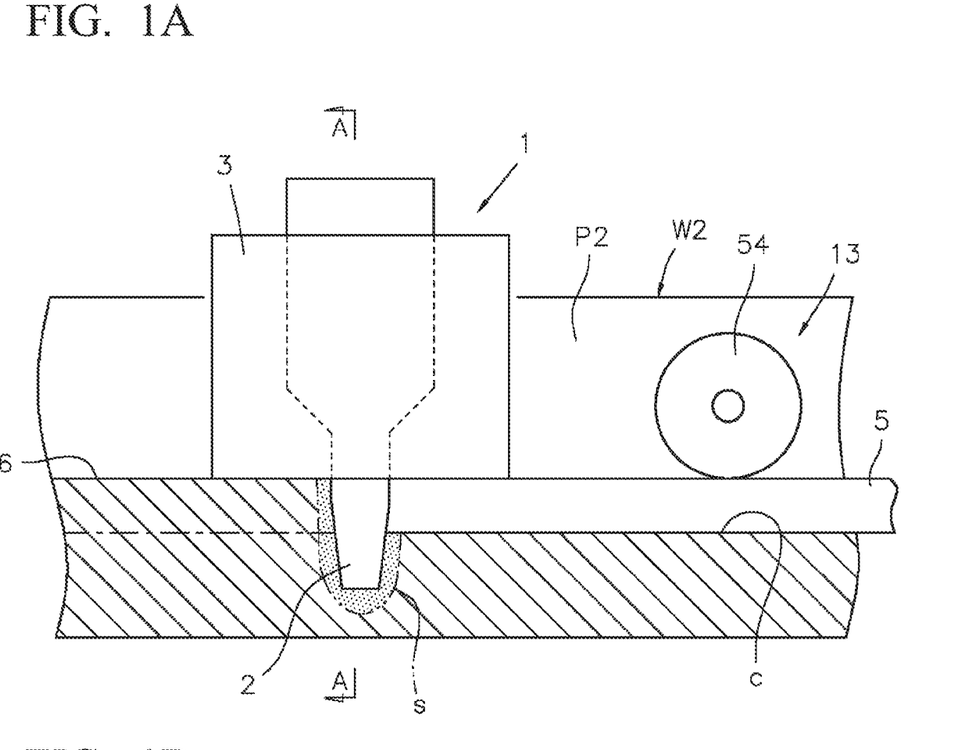
FIG. 1A is a schematic cross-sectional side view of a welding portion formed by friction stir welding, illustrating a friction stir welding method.
Figure 1B:
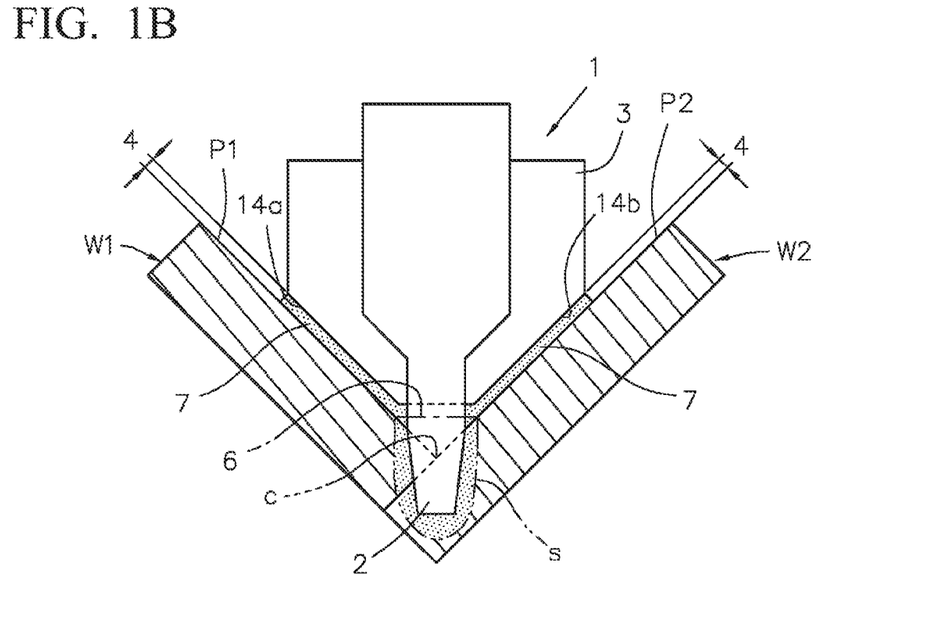
FIG. 1B is a view taken along a line A-A of FIG. 1A, illustrating the friction stir welding method.

As illustrated in FIGS. 1A and 1B, the friction stir welding method of the present disclosure uses a friction stir welding tool 1 of a type including a probe 2 and a fixed shoulder 3. When friction stir welding is performed, the friction stir welding tool 1 immerses the probe 2 into a welding portion between workpieces W1 and W2, for example, a corner portion c in FIG. 1, in a rotationally driven state, thereby forming a stirring region s of the materials of the workpieces W1 and W2 around the probe 2. At this time, the fixed shoulder 3 is disposed with a gap 4 between the fixed shoulder 3 and the surfaces P1 and P2 of the respective workpieces W1 and W2, and the gap 4 is always maintained while the probe 2 is moved along the corner portion c to perform friction stir welding.

Furthermore, during operation of friction stir welding, a filler 5 is supplied to the stirring region s. An amount of supply of the filler 5 is larger than the volume of the fillet 6 geometrically obtained from a cross-sectional shape of the fillet (reinforcement) 6 per the same unit length, indicated by the alternate long and short dash line in FIG. 1B, which is formed at the corner portion c after the friction stir welding when the friction stir welding advances by a certain unit length.

When supplying the filler 5, the materials of the workpieces W1 and W2 and the material of the filler 5 are softened and stirred by the probe 2 in the stirring region s during operation of the friction stir welding, and the fillet 6 is formed from a softened substance 7 (hereinafter referred to as "softened material substance 7") in which the materials of the workpieces W1 and W2 and the material of the filler 5 are mixed with each other. At the same time, surplus softened material substance 7 is made to flow into the gap 4 in a softened state. Therefore, at the time of friction stir welding, a layer of the softened material substance 7 is formed between the fixed shoulder 3 relatively moving with respect to the workpieces W1 and W2 and the surfaces P1 and P2 of the workpieces W1 and W2 facing the fixed shoulder 3.

First Embodiment

Figure 2:
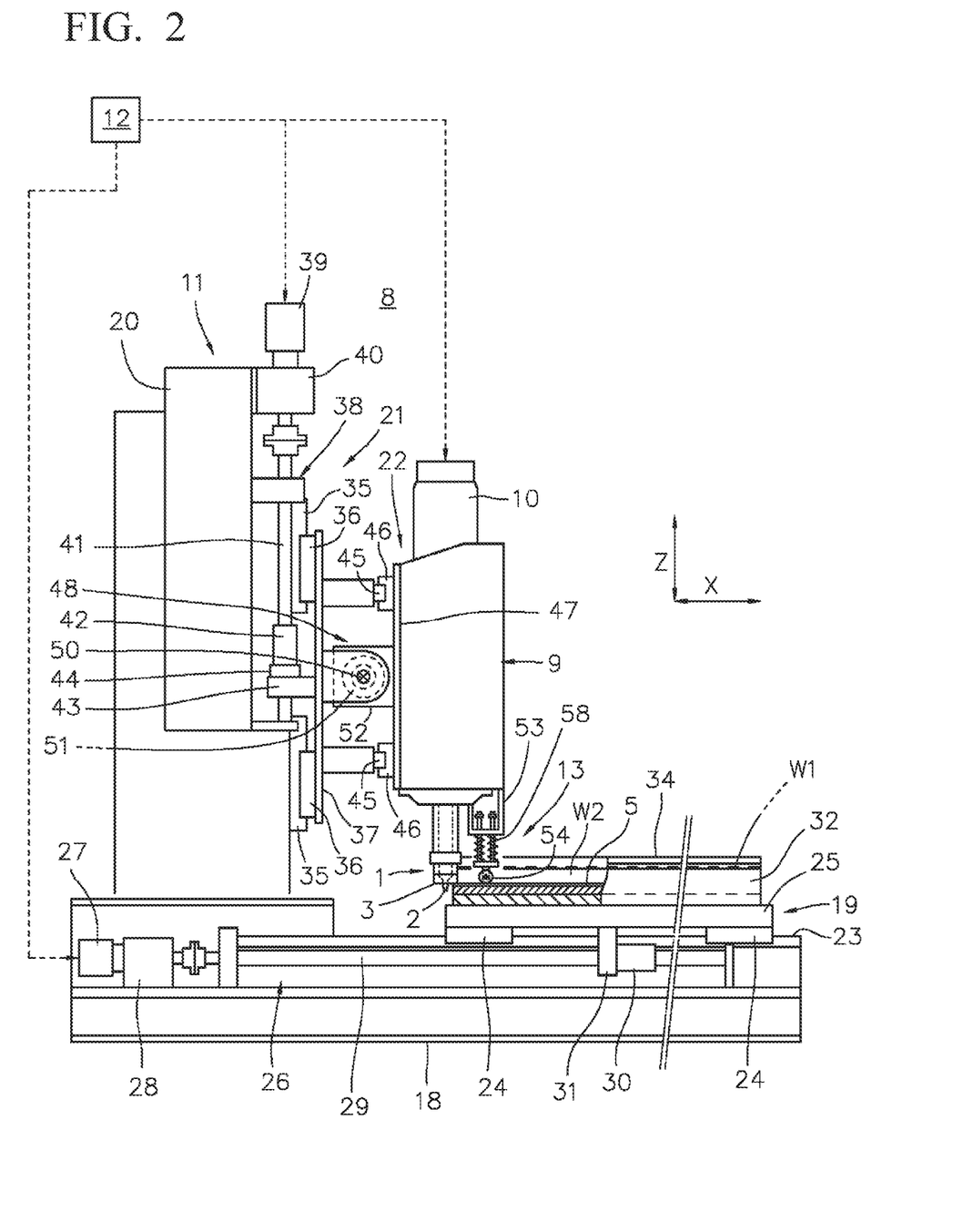
FIG. 2 is a schematic cross-sectional side view illustrating a first embodiment of a friction stir welding device.
Figure 3:
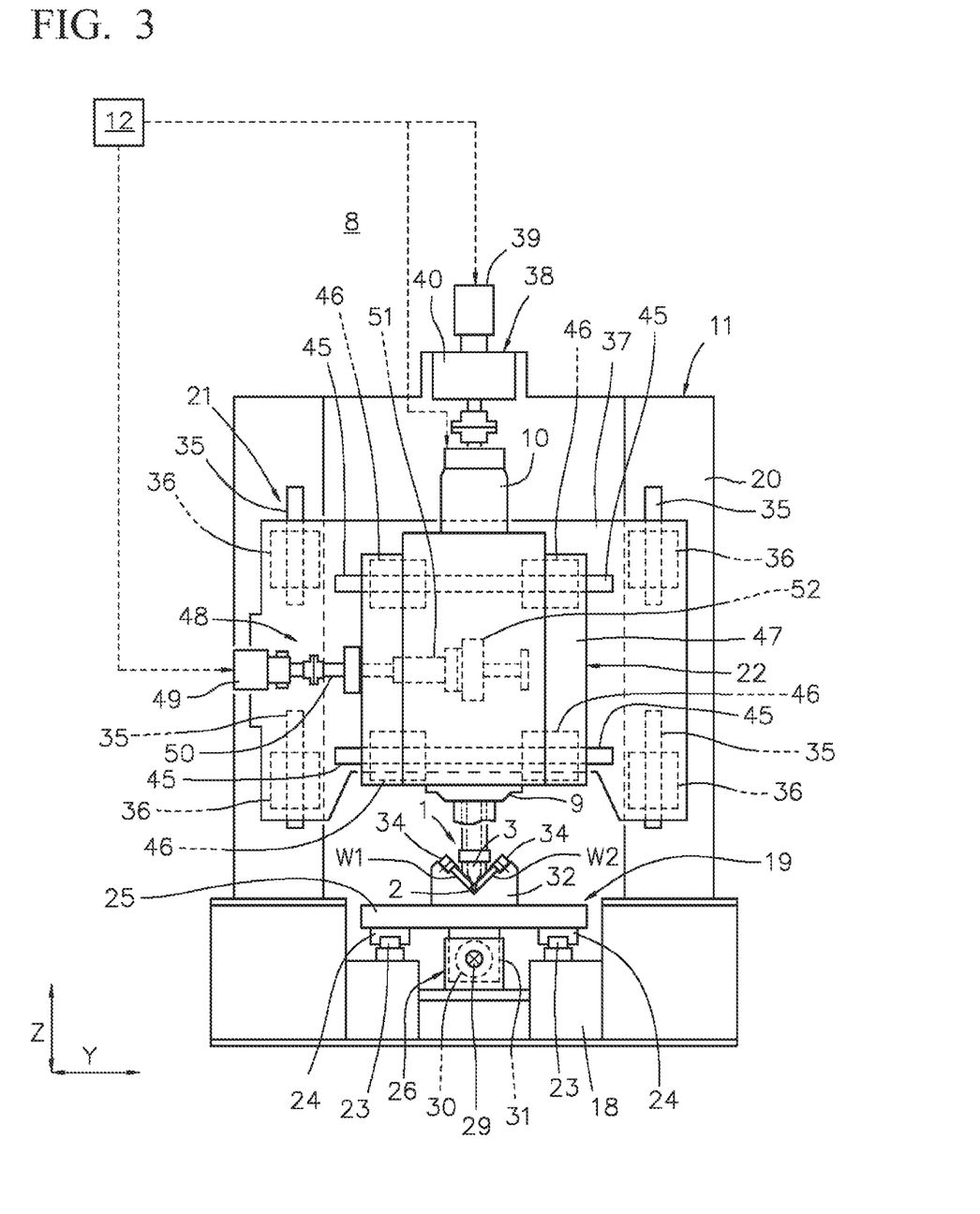
FIG. 3 is a partially cut schematic front view of the friction stir welding device of the first embodiment.
Figure 4A:
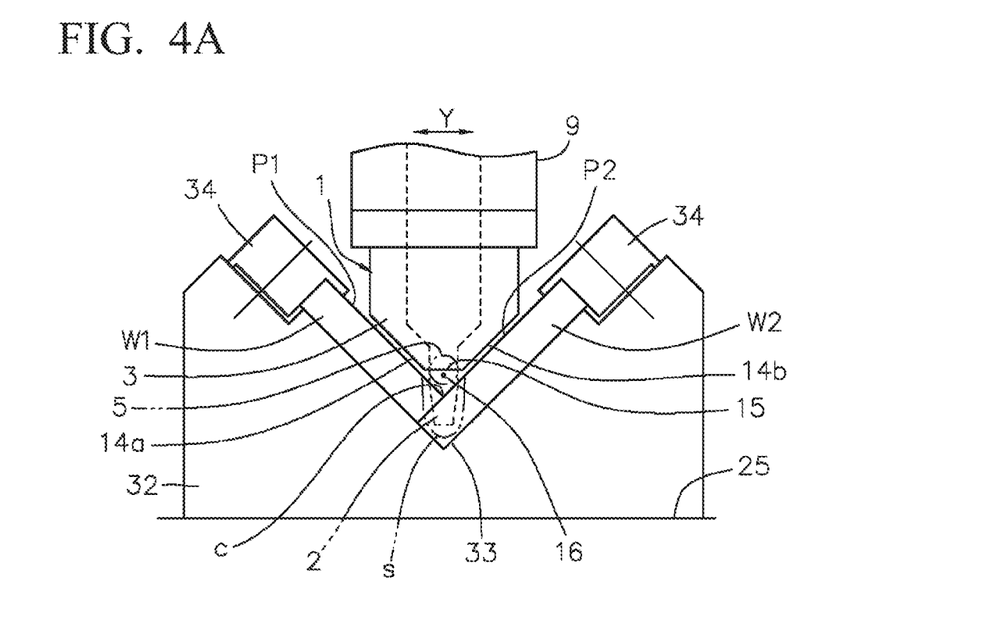
FIG. 4A is an enlarged front view of a friction stir welding tool used in the friction stir welding device of the first embodiment.
Figure 4B:
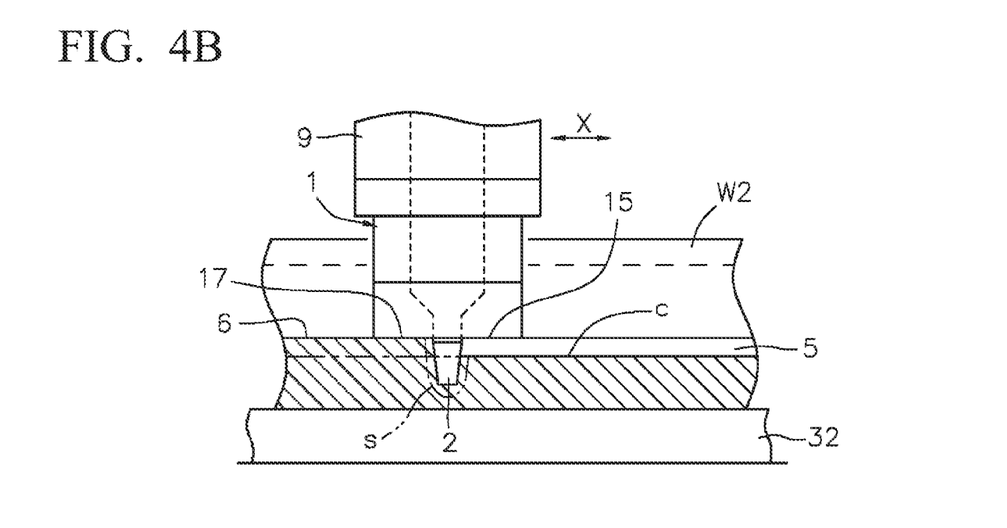
FIG. 4B is an enlarged side view of the friction stir welding tool used in the friction stir welding device of the first embodiment.
Figure 4C:
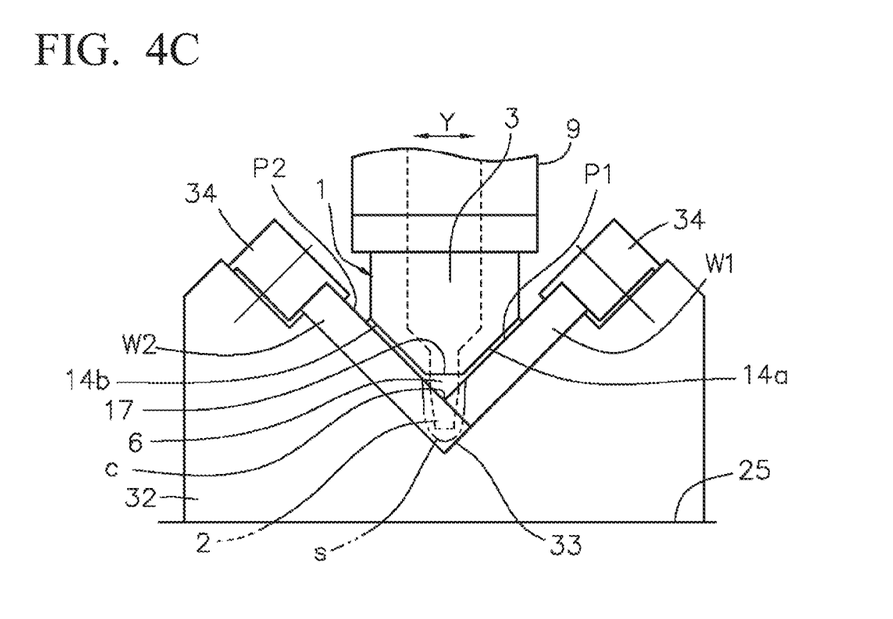
FIG. 4C is an enlarged rear view of the friction stir welding tool used in the friction stir welding device of the first embodiment.
Figure 5A:
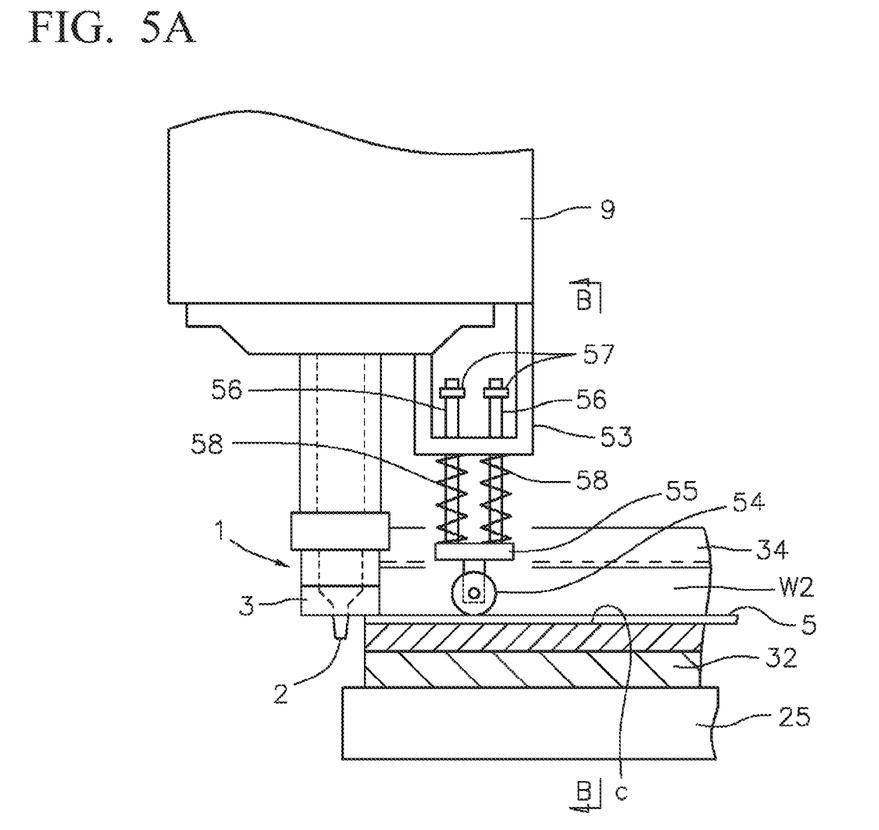
FIG. 5A is an enlarged side view of a filler supply unit in the friction stir welding device of the first embodiment.
Figure 5B:
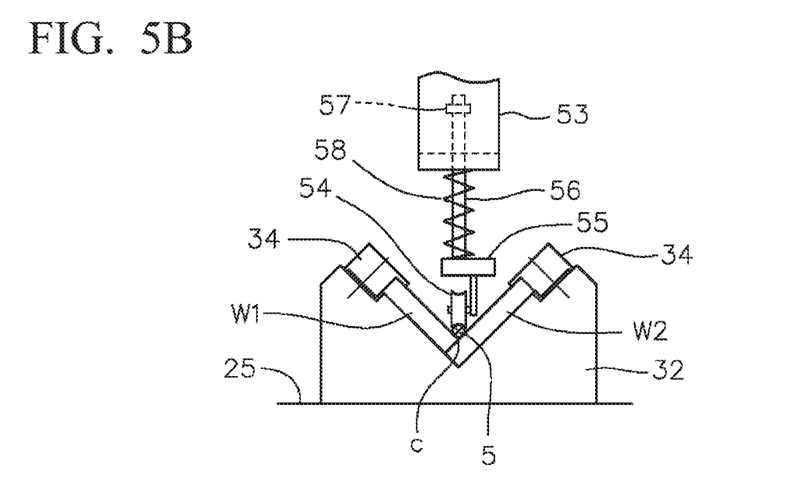
FIG. 5B is a view taken along a line B-B of FIG. 5A and an enlarged side view of the filler supply unit in the friction stir welding device of the first embodiment.

FIG. 2 is a schematic cross-sectional side view illustrating a first embodiment of the friction stir welding device, and FIG. 3 is a partially cut schematic front view. FIGS. 4A to 4C are enlarged views of the friction stir welding tool according to the present embodiment. FIG. 4A is a front view, FIG. 4B is a cut side view, and FIG. 4C is a rear view thereof. FIGS. 5A and 5B are enlarged views of the filler supply unit in the present embodiment. FIG. 5A is a side view, and FIG. 5B is a view taken along the line B-B of FIG. 5A.

Components the same as those in FIGS. 1A and 1B are denoted by the same reference numerals, and description thereof will not be provided.

As illustrated in FIGS. 2 and 3, the friction stir welding device 8 of the present embodiment includes a friction stir welding tool 1 having a probe 2 and a fixed shoulder 3, a main shaft unit 9 having a rotational driving device 10 of the probe 2 and mounted on the first end side serving as a leading end side of the friction stir welding tool 1, a three-axes type gate main shaft positioning mechanism (moving unit) 11 which relatively moves the main shaft unit 9 and the friction stir welding tool 1 relative to the corner portion c between the workpieces W1 and W2, a control device 12 of the main shaft positioning mechanism 11, and a filler supply unit 13 which supplies the filler 5 into the stirring region s of the materials of the workpieces W1 and W2 at the time of friction stir welding of the corner portion c.

When performing friction stir welding of the corner portion c, a direction (a rightward direction in FIGS. 1A and 2) in which the friction stir welding tool 1 relatively advances with respect to the corner portion c is hereinafter referred to as a welding direction.

As illustrated in FIGS. 4A to 4C, the friction stir welding tool 1 is provided with the probe 2 capable of rotational driving, and the fixed shoulder 3 disposed on the outer periphery on the proximal end side of the probe 2.

The probe 2 is disposed in an angular attitude in which the axial direction is parallel to the bisector of the angle at the corner portion c between the workpieces W1 and W2. In this embodiment, the corner portion c is a right angle, and both the workpieces W1 and W2 are inclined by 45 degrees from the vertical direction. Therefore, the axial center of the probe 2 is disposed in the vertical direction while being inclined at 45 degrees with respect to both the workpieces W1 and W2.

An end portion of the fixed shoulder 3 disposed closer to the leading end of the probe 2 has a cone shape (a V shape) which includes two workpiece facing surfaces 14a and 14b disposed opposite to the surfaces P1 and P2 of the workpieces W1 and W2 on both sides of the corner portion c. Furthermore, as illustrated in FIGS. 4A and 4B, a cavity forming cut 15 is provided in a portion which is a top portion of the mountain shape formed by the workpiece facing surfaces 14a and 14b, on the front side of the probe 2 in the welding direction. The cavity forming cut 15 forms a cavity 16 for inserting the filler 5 between the surfaces P1 and P2 of the workpieces W1 and W2. Further, in FIG. 4A, the cavity 16 illustrates an example in which the cross section perpendicular to the welding direction has a right-angled isosceles triangle shape. However, as long as the filler 5 can be inserted, the cavity 16 may have a shape corresponding to the cross section of the filler 5, and is not limited to the illustrated shape.

On the other hand, as illustrated in FIGS. 4B and 4C, a fillet forming cut portion 17 is provided in the portion which is the top portion of the mountain shape of the fixed shoulder 3, on the rear side of the probe 2 in the welding direction. The fillet forming cut portion 17 is cut in a shape corresponding to a desired cross-sectional shape so that the fillet 6 having a desired cross-sectional shape is formed at the corner portion c after welding. In the present embodiment, since the fillet 6 has a cross section which is a right-angled isosceles triangle, the cut shape of the fillet forming cut portion 17 also has a shape corresponding thereto. Therefore, for example, in the case of forming the fillet 6 with a shape having an R (curved surface) at the corner portion c after welding, the fillet forming cut portion 17 may have a shape corresponding to the cross-sectional shape of the fillet 6 having a curved surface.

As illustrated in FIGS. 2 and 3, the friction stir welding tool 1 is attached to the leading end side of the main shaft unit 9. In this state, the fixed shoulder 3 is held in the main shaft unit 9 in a state in which rotation is inhibited, and the probe 2 can be rotationally driven by the rotational driving device 10.

As illustrated in FIGS. 2 and 3, the main shaft positioning mechanism 11 includes an X-axis table 19 for placing the workpieces W1 and W2 as the welding targets on a stand 18 and moving them along the extending direction of the corner portion c.

Furthermore, a portal frame 20 that straddles the X-axis table 19 is installed on the stand 18, and a Z-axis table 21 for controlling the position of the main shaft unit 9 in the vertical direction (Z-axis direction) is attached to the portal frame 20. A Y-axis table 22 is attached to the Z-axis table 21. The Y-axis table 22 controls the position of the main shaft unit 9 in a horizontal direction (hereinafter referred to as the Y-axis direction) perpendicular to the movement direction of the X-axis table 19. The main shaft unit 9 is attached to the Y-axis table 22 in a state of being disposed above the X-axis table 19.

The X-axis table 19 includes a guide rail 23 provided on the stand 18 to extend in the X-axis direction, a movement table 25 as a horizontal flat plate shape slidably attached to the guide rail 23 via a guide block 24, and a ball screw mechanism 26 as an X-axis direction linear motion mechanism which moves the movement table 25 in the longitudinal direction of the guide rail 23.

The ball screw mechanism 26 includes a drive motor 27 such as a servo motor, a speed reducer 28 attached to the output side thereof, a screw shaft 29 connected to the output side of the speed reducer 28, and a nut member 30 attached to the screw shaft 29.

Further, the ball screw mechanism 26 is installed between the movement table 25 on the stand 18 in a posture that a screw shaft 29 extends parallel to the guide rail 23, and the nut member 30 is attached to the movement table 25 via a mounting member 31.

Thus, in the ball screw mechanism 26, by rotationally driving the screw shaft 29 via the speed reducer 28 by the drive motor 27, and by switching the rotation direction thereof, the X-axis table 19 can move the nut member 30 and the movement table 25 back and forth together in the X-axis direction. At this time, the X-axis table 19 can control the position or movement speed of the workpieces W1 and W2 placed and held on the upper side of the movement table 25, on the basis of a detection signal for the rotation amount of the drive motor 27 or a position detection signal for the nut member 30 or the movement table 25 provided by a position detection unit (not illustrated) such as a linear gauge or a displacement sensor.

On the upper side of the movement table 25, a jig 32 for holding the workpiece W1 and the workpiece W2 to be welded over the entire length is provided. For example, as illustrated in FIG. 4A, the jig 32 includes a V-shaped groove 33 on the upper surface side, and places the workpieces W1 and W2 on the two inclined surfaces of the groove 33 in a posture in which the end surface of the other workpiece W2 abuts the end edge of one workpiece W1.

Furthermore, the jig 32 includes a large number of pressing members 34 arranged in the X-axis direction on the upper end sides of each inclined surface, and presses and fixes the workpieces W1 and W2 to the inside of the groove 33 with the pressing members 34. As a result, the position of the corner portion c between the workpieces W1 and W2 is maintained over the entire length in the X-axis direction by the jig 32.

Holding of the workpieces W1 and W2 using the jig 32 is performed using a pressing load in the Z-axis direction for immersing the probe 2 of the friction stir welding tool 1 into the corner portion c at the time of friction stir welding, and a holding force prevents the workpieces W1 and W2 from being displaced even if a load in the X-axis direction acts when moving the probe 2 in the state of being immersed into the corner portion c in the longitudinal direction of the corner portion c.

Further, FIG. 4A illustrates an example of a case where the corner portion c of the workpiece W1 and the workpiece W2 is a corner joint. However, the corner portion c serving as a welding portion may be a T-shaped joint, a lap joint or a cross joint. In these cases, depending on the posture of the workpiece W1 and the workpiece W2 when the surfaces P1 and P2 of the workpiece W1 and the workpiece W2 are disposed to be inclined surfaces on both sides of the corner portion c, the shape of the jig 32 may be appropriately changed.

Further, the jig 32 is may be held in a posture in which the surface P1 of the workpiece W1 and the surface P2 of the workpiece W2 on either side of the corner portion c are held in a posture of being inclined at equal inclination angles from the vertical direction. However, depending on the shape or the arrangement of the welding when forming the corner portion c by the workpiece W1 and the workpiece W2, the jig 32 may be held in a state in which the surface P1 of the workpiece W1 and the surface P2 of the workpiece W2 form inclination angles different from each other with respect to the vertical direction.

As illustrated in FIGS. 2 and 3, the Z-axis table 21 is provided with a guide rail 35 in the vertical direction (Z-axis direction) installed in the portal frame 20, a movement table 37 as a flat plate shape along a vertical plane perpendicular to the X-axis direction slidably attached to the guide rail 35 via a guide block 36, and a ball screw mechanism 38 as a Z-axis direction linear motion mechanism for moving the movement table 37 in the longitudinal direction of the guide rail 35.

The ball screw mechanism 38 includes a drive motor 39 such as a servo motor, a speed reducer 40 attached to the output side thereof, a screw shaft 41 connected to the output side of the speed reducer 40, and a nut member 42 attached to the screw shaft 41.

Further, the screw shaft 41 is installed in a posture of extending parallel to the guide rail 35 between the ball screw mechanism 38 and the movement table 37 on the surface of the installation side of the Z-axis table 21 of the portal frame 20, and the nut member 42 is attached to the movement table 37 via the load cell 44 and the attachment member 43.

Thus, in the ball screw mechanism 38, by rotationally driving the screw shaft 41 via the speed reducer 40 by the drive motor 39, and by switching the rotation direction thereof, the Z-axis table 21 can move the nut member 42 and the movement table 37 back and forth together in the vertical direction which is the Z-axis direction. At this time, on the basis of the detection signal of the rotation amount of the drive motor 39, or the position detection signal of the nut member 42 or the movement table 37 provided by a position detection unit (not illustrated) such as a linear gauge or a displacement sensor, the Z-axis table 21 can control the vertical positions of the main shaft unit 9 and the friction stir welding tool 1 held on the movement table 37 via the Y-axis table 22 as will be described later.

Further, the Z-axis table 21 can detect the pressing load in the direction toward the corner portion c applied to the friction stir welding tool 1 at the time of friction stir welding, on the basis of the detection signal of the load cell 44.

Although not illustrated, in the Z-axis table 21, a gravity compensating mechanism (also referred to as a self-weight compensating mechanism and a weight compensating mechanism) which supports the self-weight of the movement table 37 and the weight of parts moving up and down together with the movement table 37 may be interposed between the portal frame 20 and the movement table 37. According to this configuration, it is possible to directly detect the pressing load at the corner portion c applied to the friction stir welding tool 1 by the load cell 44.

As illustrated in FIGS. 2 and 3, the Y-axis table 22 is provided with a guide rail 45 in the Y-axis direction installed on the movement table 37 of the Z-axis table 21, a movement table 47 as a flat plate shape along a vertical plane perpendicular to the X-axis slidably attached to the guide rail 45 via a guide block 46, and a ball screw mechanism 48 as a Y-axis direction linear motion mechanism for moving the movement table 47 in the longitudinal direction of the guide rail 45.

The ball screw mechanism 48 includes a drive motor 49 such as a servo motor, a screw shaft 50 connected to the output side thereof, and a nut member 51 attached to the screw shaft 50.

Further, the ball screw mechanism 48 is installed between the movement table 37 and the movement table 47 in a posture in which the screw shaft 50 extends parallel to the guide rail 45, and the nut member 51 is attached to the movement table 47 via the attachment member 52. The main shaft unit 9 is attached to the movement table 47.

Therefore, in the ball screw mechanism 48, by rotationally driving the screw shaft 50 by the drive motor 49, and by switching the rotation direction thereof, the Y-axis table 22 can move the nut member 51 and the movement table 47 back and forth together in the Y-axis direction. At this time, the Y-axis table 22 can control the positions in the Y-axis direction of the main shaft unit 9 and the friction stir welding tool 1 held in the movement table 47, on the basis of the detection signal of the rotation amount of the drive motor 49 or the position detection signal of the nut member 51 or the movement table 47 provided by a position detection unit (not illustrated) such as a linear gauge or a displacement sensor.

The control device 12 of the main shaft positioning mechanism 11 has a function of controlling the positions in the vertical direction and the horizontal direction of the friction stir welding tool 1 attached to the main shaft unit 9 via the control of the Z-axis table 21 and the Y-axis table 22, within a plane perpendicular to the direction in which the corner portion c between the workpieces W1 and W2 extends.

The control device 12 has a function of controlling the position in the X-axis direction of the corner portion c of the workpieces W1 and W2 held on the movement table 25 via the jig 32, via the control of the X-axis table 19.

Further, the control device 12 controls the rotational driving of the probe 2 via the control of the rotational driving device 10 of the main shaft unit 9.

When performing the friction stir welding, as illustrated in FIG. 12, first, the control device 12 disposes the corner portion c of the workpieces W1 and W2 via the control of the X-axis table 19 such that the starting end side of the friction stir welding set at the first end (one end) side (left end side of FIG. 1) in the longitudinal direction is located below the main shaft unit 9. Next, in the above state, the control device 12 starts the rotational driving of the probe using the rotational driving device 10, and immerses the probe 2 into the corner portion c via the control of the Y-axis table 22 and the Z-axis table 21. Next, the control device 12 starts the movement of the movement table 25 of the X-axis table 19, relatively moves the probe 2 along the corner portion c between the workpieces W1 and W2, and performs the friction stir welding of the corner portion c. Thereafter, when the probe 2 reaches the terminal end side of the friction stir welding set on the second end (the other end) side (the right end side in FIG. 1) in the longitudinal direction of the corner portion c, the control device 12 stops the movement table 25, and then controls the Z-axis table 21 such that the probe 2 is extracted from the corner portion c.

Furthermore, when performing the friction stir welding as described above, the control device 12 has the function of holding the position of the fixed shoulder 3 of the friction stir welding tool 1 at a position separated by the gap 4 from the surfaces P1 and P2 of the workpieces W1 and W2 as illustrated in FIG. 1B, via the control of the Z-axis table 21.

In order to hold the fixed shoulder 3 at a position where the gap 4 is formed, for example, the control device 12 may control the position of the fixed shoulder 3 such that it is at a position separated from the surfaces P1 and P2 by the desired gap 4 as the target position, on the basis of information on the positions of the surfaces P1 and P2 of the workpieces W1 and W2 held on the X-axis table 19.

Further, when the probe 2 is immersed into the corner portion c, the amount of immersion of the probe 2 increases or decreases in accordance with the magnitude of the pressing load applied to the probe 2 by the Z-axis table 21. Further, in a state in which the probe 2 is immersed into the corner portion c, the distance between the workpiece facing surfaces 14a and 14b of the fixed shoulder 3 and the surfaces of the workpieces W1 and W2 is ascertained on the basis of the known positional relation between the probe 2 and the fixed shoulder 3. Therefore, the control device 12 may hold the fixed shoulder 3 at a position where the desired gap 4 is formed with respect to the surfaces P1 and P2 of the workpieces W1 and W2, by controlling the pressing load of the probe 2 detected by the load cell 44 in the state of immersing the probe 2 being immersed into the corner portion c.

The lower limit and the upper limit of the size of the gap 4 are set in a range of sizes in which the softened material substance 7 softened and stirred by the probe 2 flows into the gap 4 while being softened and can fill the gap 4 between the workpiece facing surfaces 14a and 14b of the fixed shoulder 3 and the surfaces P1 and P2 of the workpieces W1 and W2.

That is, the softened material substance 7 stirred by the probe 2 has fluidity, but it is only a solid and not liquid. Therefore, when the gap 4 is too small, the resistance when the softened material substance flows into the gap 4 increases. In this case, the softened material substance 7 cannot spread into the gap 4. Therefore, the lower limit of the size of the gap 4 depends on the degree of fluidity of the softened material substance 7. When the workpieces W1 and W2 and the material of the filler 5 are aluminum (aluminum alloy), it may be that the size of the gap 4 be set to 0.1 mm or more.

On the other hand, the upper limit of the size of the gap 4 is determined as follows.

In order for the softened material substance 7 entering the gap 4 to spread throughout the gap 4 while having fluidity, heat (frictional heat) generated by the rotating probe 2 needs to be transmitted to the entire softened material substance 7 entering the gap 4 under temperature conditions that can maintain the softened state.

The amount of heat generated by the probe 2 depends on the operation conditions of the friction stir welding such as the structure of the probe 2, the rotational speed, the amount of immersion into the corner portion c, and the relative movement speed with respect to the corner portion c. Therefore, at the time of friction stir welding, the amount (volume) of the softened material substance 7 that can be softened by the heat generated by the probe 2 has an upper limit, depending on the properties of the material or heat transfer characteristics. Therefore, the upper limit of the volume of the gap 4 in which surplus softened material substance 7 of the softened material substance 7 used for forming the fillet 6 can flow in and spread may also be determined. Therefore, by dividing the upper limit value of the volume of the gap 4 by the area of the workpiece facing surfaces 14a and 14b of the fixed shoulder 3, the upper limit value of the size of the gap 4 is determined.

After the friction stir welding, the solidified substance of the softened material substance 7 that has entered the gap 4 is in a state of protruding from the surfaces P1 and P2 of the workpieces W1 and W2. Therefore, depending on the kinds of the workpieces W1 and W2, in some cases, it is desired to inhibit stress concentration on the protruding portions formed on the surfaces P1 and P2. The upper limit value of the size of the gap 4 may be set from this point of view.

When the size of the gap 4 is determined in this way, the volume per unit length in the advancement direction of the friction stir welding of the gap 4 is determined. Therefore, the supply amount of the filler 5 is set to be equal to or higher than an amount obtained by adding the capacity per unit length in the welding direction of the gap 4 to the volume per unit length of the fillet 6 formed at the corner portion c.

For example, the filler supply unit 13 may supply wire-shaped filler 5 as illustrated in FIG. 1A to the stirring region s through the cavity 16 formed between the workpieces W1 and W2 by the cavity forming cut 15 of the fixed shoulder 3 illustrated in FIGS. 4A and 4B.

Therefore, as illustrated in FIG. 2, the filler supply unit 13 is equipped with a bracket 53 provided at the lower end side (leading end side) of the main shaft unit 9 so as to be disposed on the front side of the attachment position of the friction stir welding tool 1 in the welding direction.

On the lower side of the bracket 53, as illustrated in FIGS. 5A and 5B, a frame 55 which holds a roller 54 for pressing the filler 5 from above is disposed. A plurality of, for example, two guide rods 56 extending vertically are erected on the upper side of the frame 55. The guide rods 56 are inserted into guide holes (not illustrated) provided in the bracket 53 in the vertical direction from below, and a retaining member 57 is attached to the upper end side. A spring 58 as a pressing portion is fitted to the outer periphery of the guide rod 56 between the upper surface of the frame 55 and the lower surface of the bracket 53.

In the filler supply unit 13, at the time of the friction stir welding, when the main shaft unit 9 is lowered to bring the probe 2 close to the corner portion c in a state in which the filler 5 is disposed in advance along the corner portion c located on the front side of the friction stir welding tool 1 in the welding direction, the roller 54 comes into contact with the filler 5 from above. From this state, when the main shaft unit 9 is further moved downward to a position where the probe 2 is immersed into the corner portion c, the spring 58 contracts between the frame 55 of the roller 54 and the bracket 53, and the roller 54 can be pressed and pressurized against the filler 5 from above by a restoring force of the contracted spring 58.

Further, the spring 58 is described as an example of the pressing portion, but anything may be adopted as long as it is possible to apply a pressing force in a direction toward the filler 5 to the roller 54, any other type of pressing portion such as a gas spring or a fluid pressure cylinder may be adopted, and a pressing portion such as an actuator which actively generates a pressing force may be adopted.

Therefore, the filler 5 is fixed to the corner portion c. In this state, when the friction stir welding of the corner portion c by the friction stir welding tool 1 advances, the filler 5 is guided to the cavity 16 formed between the cavity forming cut 15 of the fixed shoulder 3 and the surfaces P1 and P2 of the workpieces W1 and W2, and is introduced into the stirring region s.

Furthermore, the filler supply unit 13 applies a pressure of at least 1 MPa or more to the leading end side of the filler 5 supplied to the stirring region s in the direction perpendicular to the supply direction.

In the present embodiment, the filler 5 is supplied to the stirring region s with an advancement of the friction stir welding of the corner portion c using the friction stir welding tool 1, in the state of being pressed against the corner portion c. Therefore, in the present embodiment, the frictional force (maximum frictional force) generated between the filler 5 and the surfaces P1 and P2 of the workpieces W1 and W2 on both sides of the corner portion c is the product of the pressure applied to the surfaces P1 and P2 as the frictional surfaces, that is the areas of the surfaces P1 and P2 and the coefficient of friction and is the product of the pressure applied to the leading end side of the filler 5 and the cross-sectional area of the filler 5. Therefore, the pressing force is set when pressing the filler 5 by the roller 54 in consideration of the friction coefficient between the filler 5 and the surfaces P1 and P2 such that a pressure of at least 1 MPa or more is applied to the leading end side of the filler 5 in the direction perpendicular to the supply direction of the filler 5. Further, the upper limit of the pressure applied to the leading end side of the filler 5 supplied to the stirring region s is defined by a buckling strength from the position pressed by the roller 54 of the filler 5 to the leading end.

In the present embodiment, the filler 5 is fixed to the corner portion c. Therefore, in order to obtain the supply amount of the filler 5 described above, the cross-sectional area of the filler 5 is set to be equal to or larger than the area obtained by adding the cross-sectional area in the cross section perpendicular to the welding direction of the of the gap 4 to the cross-sectional area of the fillet 6 formed in the corner portion c.

As described above, according to the friction stir welding device 8 of the present embodiment, after the probe 2 of the friction stir welding tool 1 is immersed into the corner portion c between the workpieces W1 and W2, by moving the probe 2 along the corner portion c, the corner portion c of the workpieces W1 and W2 is subjected to friction stir welding.

At this time, the fixed shoulder 3 of the friction stir welding tool 1 is not in contact with the surfaces P1 and P2 of the workpieces W1 and W2. Furthermore, since the softened material substance 7 is present in the gap 4 between the workpiece facing surfaces 14a and 14b of the fixed shoulder 3 and the surfaces P1 and P2 of the workpieces W1 and W2, the solidified matter of the material softened substance 7 is prevented from adhering to and accumulating on the fixed shoulder 3. Further, even if the solidified matter of the material softened substance 7 adheres to the fixed shoulder 3, the deposit is prevented from adhering to the surface of the fillet 6.

Therefore, according to the friction stir welding device of the present embodiment, when performing the friction stir welding of the corner portion c which is the welding portion between the workpieces W1 and W2, while applying the filler 5 using the friction stir welding tool 1 including the fixed shoulder 3, it is possible to inhibit occurrence of defects on the surface of the fillet 6 formed in the corner portion c.

Second Embodiment

Figure 6A:
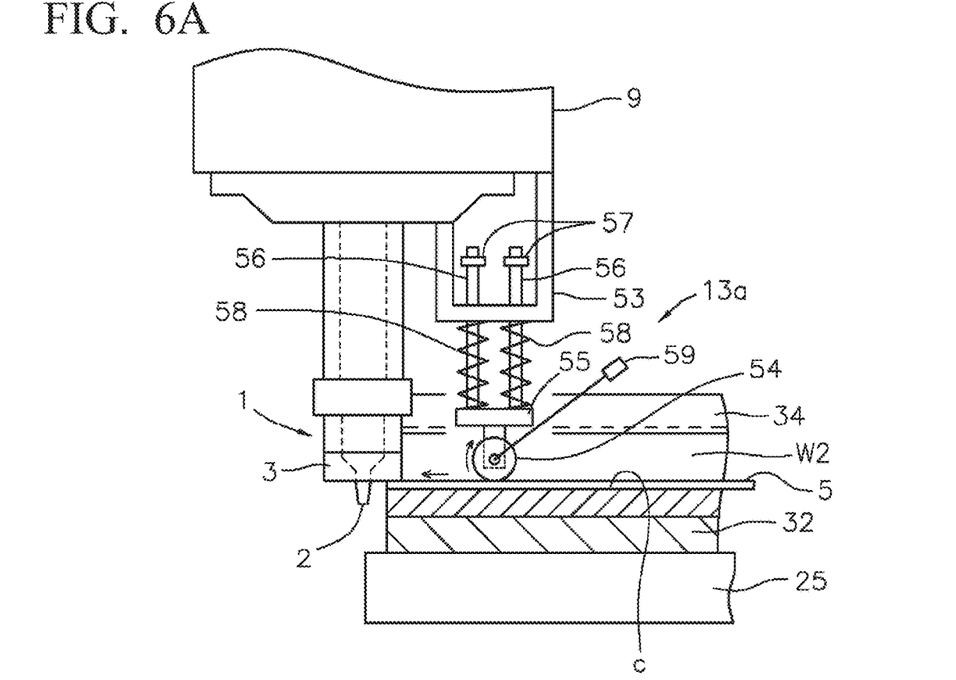
FIG. 6A is a schematic view illustrating another example of a filler supply unit of a friction stir welding device according to a second embodiment.
Figure 6B:
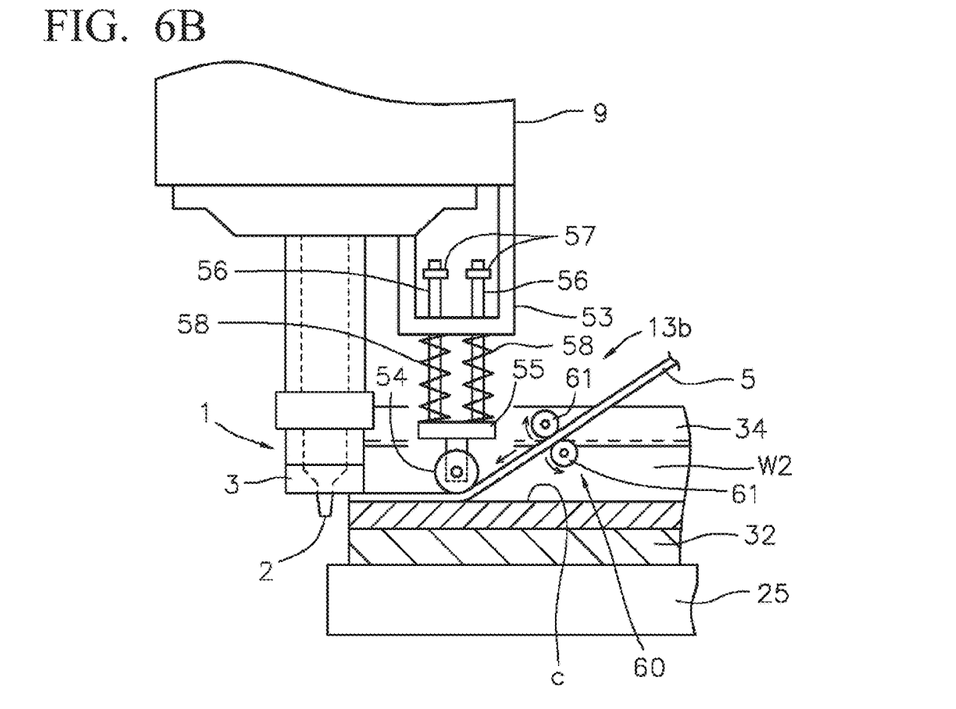
FIG. 6B is a schematic view illustrating still another example of the filler supply unit of the friction stir welding device according to the second embodiment.

FIG. 6 illustrates a second embodiment of the friction stir welding device, and FIGS. 6A and 6B are schematic views illustrating another example of the filler supply unit.

Further, in FIGS. 6A and 6B, components the same as those illustrated in the first embodiment are denoted by the same reference numerals, and description thereof will not be provided.

A filler supply unit 13a illustrated in FIG. 6A has a configuration similar to that of the filler supply unit 13 of the first embodiment, and a drive motor 59 as a rotation drive unit is connected to a roller 54. Although illustrated in FIG. 6A in a simplified manner, in reality, a power transmission mechanism such as a gear, a chain or a sprocket which transmits a rotational driving force is provided between the drive motor 59 and the roller 54.

The direction of rotational driving of the roller 54 provided by the drive motor 59 is a clockwise direction in FIG. 6A, and the roller 54 imparts a driving force to the filler 5 such that the filler 5 against which the roller 54 is pressed from above is fed in a direction directed to the friction stir welding tool 1.

According to the filler supply unit 13a, by rotationally driving the roller 54, it is possible to actively supply the filler 5 to the stirring region s.

A filler supply unit 13b illustrated in FIG. 6B has a configuration similar to the filler supply unit 13 of the first embodiment, and includes a delivery unit 60 of the filler 5 on the front side of the roller 54 in the welding direction.

The delivery unit 60 includes, for example, a pair of delivery rollers 61 disposed to sandwich the filler 5, and a rotation drive unit (not illustrated) that rotatably drives the delivery rollers 61 in directions opposite to each other. The delivery direction of the filler provided by the delivery roller 61 is a leftward direction in FIG. 6B, and the delivery roller 61 applies a driving force to the filler 5 so that the filler 5 is fed in a direction directed toward the friction stir welding tool 1.

According to the filler supply unit 13b, it is possible to actively supply the filler 5 delivered from the delivery unit 60 to the stirring region s, while guiding the filler 5 by the roller 54.

Further, in either case of FIGS. 6A and 6B, the filler supply units 13a and 13b apply a pressure of at least 1 MPa or more to the leading end side of the filler 5 supplied to the stirring region s in the direction perpendicular to the supply direction.

Therefore, according to the filler supply units 13a and 13b of FIGS. 6A and 6B, it is possible to use the filler 5 having a smaller cross-sectional area than the value obtained by adding the cross-sectional area in the cross section perpendicular to the welding direction of the gap 4 to the cross-sectional area of the fillet 6 formed in the corner portion c. Therefore, when the supply amount of the filler 5 of the first embodiment is set to a predetermined amount, the supply amount of the filler 5 in the second embodiment can be set to be equal to or higher than the above-mentioned predetermined amount.

Figure 7A:
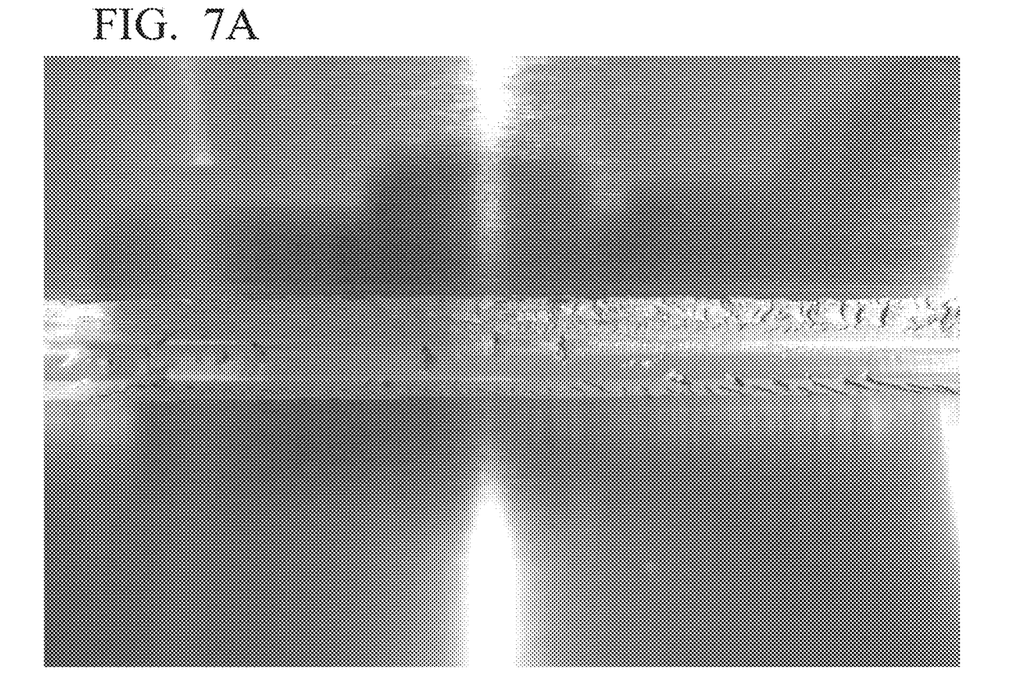
FIG. 7A is a photograph illustrating a welding portion formed by conventional friction stir welding.
Figure 7B:
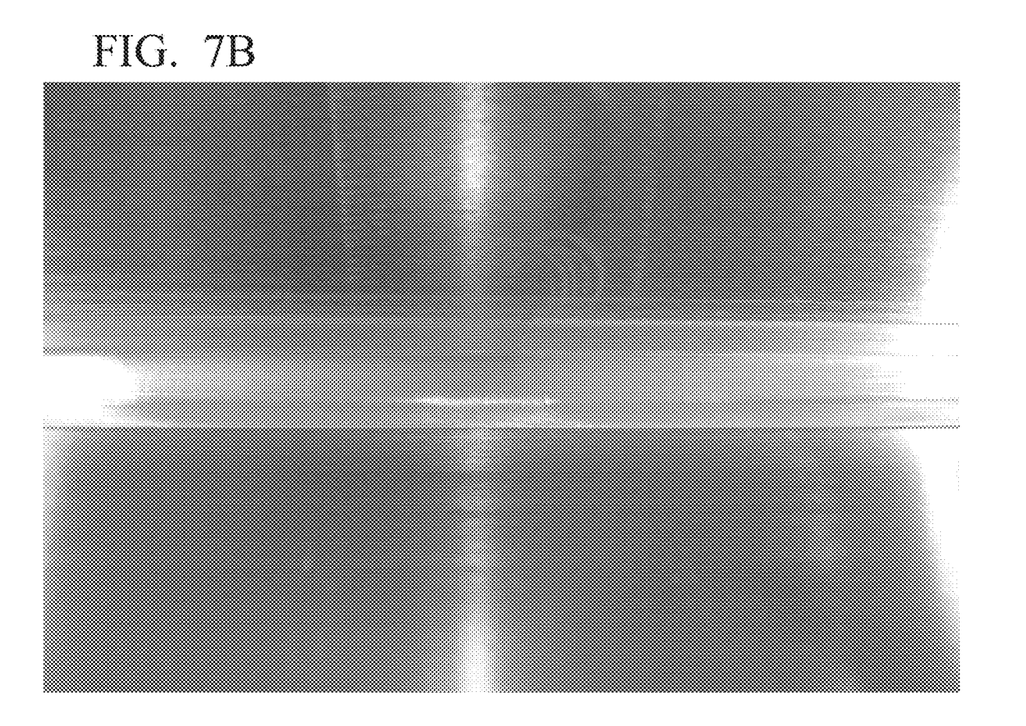
FIG. 7B is a photograph illustrating a welding portion formed by friction stir welding according to the present disclosure.

FIG. 7A illustrates a photograph of a welding portion formed by the conventional friction stir welding, and FIG. 7B illustrates a photograph of a welding portion formed by the friction stir welding according to the present disclosure. It is possible to understand from FIG. 7A that a plurality of defects are generated in the welding portion formed by the friction stir welding due to non-formation of the gap 4 between the workpiece W1 and the workpiece W2 or insufficient supply of the filler 5. On the other hand, it is possible to understand from FIG. 7B that a gap 4 is formed between the workpiece W1 and the workpiece W2 at the welding portion formed by the friction stir welding according to the present disclosure, and since the supply amount of the filler 5 is sufficient, defects are not formed.

Further, although the cross-sectional shape of the filler 5 is illustrated as being round, a filler having an angular cross-sectional shape or any other cross-sectional shape may be used. Although the filler 5 is described as having a wire shape, it may be rod-like.

Also, the present disclosure is not limited to each of the above embodiments. The first embodiment illustrates a configuration in which the filler supply unit 13 fixes the filler 5 to the corner portion c, and the filler 5 is supplied to the stirring region s relative to advancement of the friction stir welding tool 1. However, a phenomenon in which the filler 5 is pushed back in the welding direction by the softened material substance 7 existing in the probe 2 or the stirring region s formed around the probe 2 may occur. In this case, it may be possible to use filler 5 having a cross-sectional area which exceeds the area obtained by adding the cross-sectional area in the cross section perpendicular to the welding direction of the gap 4 to the cross-sectional area of the fillet 6 formed at the corner portion c so that the supply amount of the filler 5 becomes the above-mentioned predetermined amount even if the filler 5 is pushed back.

In the first embodiment, the workpieces W1 and W2 to be welded by friction stir welding are illustrated as being disposed in a state in which the end surface of the workpiece W2 is in contact with the end edge of the workpiece W1. However, a gap may be formed between the workpiece W1 and the workpiece W2. In this case, the workpieces W1 and W2 may be held by the jig 32 in a state in which the workpieces W1 and W2 are disposed with a gap therebetween, and the friction stir welding may be performed in this state. Also, in this case, since the softened material substance 7 enters the gap between the workpieces W1 and W2, the supply amount of the filler may be defined by the amount expected to enter the gap.

In the friction stir welding device and the friction stir welding method according to the present disclosure, description has been given of a case where the friction stir welding is performed in a state in which the workpieces W1 and W2 are disposed in the posture in which the corner portion c is open upward. However, the corner portion c between the workpieces W1 and W2 may have any orientation. In this case, the direction in which the corner portion c extends between the workpieces W1 and W2 may be set as the X-axis, and the orientation of the three-dimensional orthogonal coordinate system in which the Y-axis and the Z-axis are set in a plane perpendicular thereto may be disposed in accordance with the postures of the workpieces W1 and W2.

Further, in the friction stir welding device and the friction stir welding method of the present disclosure, the second workpiece is disposed in contact with the end edge of the first workpiece in a posture at an angle intersecting with the surface P1 of the first workpiece, but a case where corner portions c formed on both sides of the second workpiece are subjected to friction stir welding, using two friction stir welding tools disposed on each of the two sides of the second workpiece may be applied thereto.

Furthermore, the friction stir welding device and the friction stir welding method of the present disclosure may be applied to, for example, the friction stir welding of a welding portion in which end portions of flat plate-like workpieces abut against each other. In this case, a friction stir welding tool equipped with a fixed shoulder having a flat workpiece facing surface is used as the friction stir welding tool. In the friction stir welding, since the fillet 6 does not exist, the supply amount of the filler 5 may be set to be equal to or higher than an amount obtained by adding the volume may be set for filling the gap 4 when disposing the fixed shoulder with a gap between it and the surface of each workpiece to the volume maybe set for filling the cavity formed at the abutting portion of each workpiece.

As a moving unit for relatively moving the friction stir welding tool 1 together with the main shaft unit 9 with respect to the corner portion c of the workpieces W1 and W2 in the direction along the corner portion, an example of the main shaft positioning mechanism 11 which fixes the portal frame 20 supporting the main shaft unit 9 and moves the workpieces W1 and W2 has been illustrated. However, for example, any type of moving unit other than the illustrated type may be adopted, such as a unit which fixes the workpieces W1 and W2 and sets the portal frame 20 straddling the workpieces as a movement type.

Various modifications may be made within the scope that does not depart from the gist of the present disclosure.

INDUSTRIAL APPLICABILITY

According to the friction stir welding device and the friction stir welding method of the present disclosure, when performing friction stir welding on a welding portion between workpieces, while applying a filler, using a friction stir welding tool having a fixed shoulder, it is possible to inhibit occurrence of defects on the surface of a fillet formed along the surface.

What is claimed is:

1. A friction stir welding device comprising:
a friction stir welding tool provided with a non-rotatable fixed shoulder on an outer periphery on a proximal end side of a rotationally drivable probe;
a moving unit which relatively moves the friction stir welding tool to a welding portion between workpieces in a direction along the welding portion;
a control device of the moving unit; and
a filler supply unit which supplies, during friction stir welding of the welding portion, a filler to a stirring region, wherein the stirring region is stirred by the rotationally drivable probe,
wherein the welding portion between the workpieces is a corner portion,
the non-rotatable fixed shoulder has two workpiece facing surfaces disposed opposite to surfaces of the workpieces on both sides of the welding portion, and
the control device is programmed to hold the non-rotatable fixed shoulder such that a gap between an entirety of the two workpiece facing surfaces of the non-rotatable fixed shoulder and the surfaces of the workpieces is formed, and the entirety of the two workpiece facing surfaces are parallel to the surfaces of the workpieces, while the rotationally drivable probe is immersed into the welding portion and relatively moves with respect to the workpieces.

2. The friction stir welding device according to claim 1, wherein the filler supply unit is disposed on a front side of the friction stir welding tool in a welding direction.

3. The friction stir welding device according to claim 2, wherein the filler supply unit applies a pressure of at least 1 MPa or more to a leading end side of the filler supplied to the stirring region in a direction perpendicular to a supply direction.

4. The friction stir welding device according to claim 1, wherein
the filler supply unit supplies the filler in a supply amount equal to or greater than an amount obtained by adding a capacity per unit length in a welding direction of the gap to a volume per unit length of a fillet formed at the corner portion.

5. The friction stir welding device according to claim 2, wherein
the filler supply unit supplies the filler in a supply amount equal to or greater than an amount obtained by adding a capacity per unit length in the welding direction of the gap to a volume per unit length of a fillet formed at the corner portion.

6. The friction stir welding device according to claim 3, wherein
the filler supply unit supplies the filler in a supply amount equal to or greater than an amount obtained by adding a capacity per unit length in the welding direction of the gap to a volume per unit length of a fillet formed at the corner portion.

7. The friction stir welding device according to claim 4, wherein an end portion of the fixed shoulder of the friction stir welding tool disposed closer to a leading end of the probe has a mountain shape having the two workpiece facing surfaces,
a cavity forming cut which forms a cavity between the probe and the surfaces of the workpieces is included on a front side of the probe at a top portion of the mountain shape in the welding direction, and
a cut corresponding to a cross-sectional shape of the fillet is included on a rear side of the probe at a top portion of the mountain shape in the welding direction.

8. The friction stir welding device according to claim 5, wherein an end portion of the fixed shoulder of the friction stir welding tool disposed closer to a leading end of the probe has a mountain shape having the two workpiece facing surfaces,
a cavity forming cut which forms a cavity between the probe and the surfaces of the workpieces is included on a front side of the probe at a top portion of the mountain shape in the welding direction, and
a cut corresponding to a cross-sectional shape of the fillet is included on a rear side of the probe at the top portion of the mountain shape in the welding direction.

9. The friction stir welding device according to claim 6, wherein an end portion of the fixed shoulder of the friction stir welding tool disposed closer to the leading end of the probe has a mountain shape having the two workpiece facing surfaces, a cavity forming cut which forms a cavity between the probe and the surfaces of the workpieces is included on a front side of the probe at a top portion of the mountain shape in the welding direction, and a cut corresponding to a cross-sectional shape of the fillet is included on a rear side of the probe at the top portion of the mountain shape in the welding direction.

10. The friction stir welding device according to claim 1, wherein a size of the gap is set based at least one of a degree of fluidity the filler and a degree of fluidity the workpieces.

11. The friction stir welding device according to claim 1, wherein the filler supply unit includes a roller which presses and pressurizes a leading end side of the filler supplied to the stirring region against the welding portion in a direction perpendicular to a supply direction.

12. The friction stir welding device according to claim 11, wherein the filler supply unit includes a drive motor which is connected to the roller and rotationally drives the roller.

13. The friction stir welding device according to claim 11, wherein the filler supply unit includes a spring which is disposed above the roller in a vertical direction.

14. The friction stir welding device according to claim 11, wherein the filler supply unit includes a delivery unit which supplies the filler to the roller, and the delivery unit includes a pair of delivery rollers which sandwich the filler and a rotation drive unit which rotatably drives the delivery rollers.

15. The friction stir welding device according to claim 7, wherein during friction stir welding of the welding portion, a distance between a leading end portion of the cavity forming cut and the welding portion is equal to a distance between a leading end portion of the cut and the welding portion.

* * * * *